United States Patent [19]

Koyama et al.

[11] Patent Number: 5,282,673
[45] Date of Patent: Feb. 1, 1994

[54] COMPOUND RESIN WHEEL

[75] Inventors: Haruo Koyama, Saitama; Youichi Nishimuro, Tokyo; Kunio Machida, Tokyo; Yoshihide Fukahori, Tokyo, all of Japan

[73] Assignee: Bridgestone Corporation, Tokyo, Japan

[21] Appl. No.: 901,781

[22] Filed: Jun. 22, 1992

[30] Foreign Application Priority Data

Jul. 16, 1991 [JP] Japan ................... 3-175373

[51] Int. Cl.⁵ .............................. B60B 23/00
[52] U.S. Cl. ................... 301/64.4; 301/10.1; 301/63.1
[58] Field of Search ........... 301/9.1, 10.1, 11.1, 301/35.51, 35.1, 35.2, 11.3, 63.1, 64.3, 64.4, 64.7

[56] References Cited

U.S. PATENT DOCUMENTS

| | | | |
|---|---|---|---|
| 2,017,034 | 10/1935 | Avery | 301/64.4 |
| 4,363,347 | 12/1982 | Baumgartner | 152/411 |
| 4,514,013 | 4/1985 | Woelfel et al. | 301/64.7 |
| 4,532,097 | 7/1985 | Daniels et al. | 301/64.7 X |
| 4,749,235 | 6/1988 | McDougall | 301/64.7 |
| 4,983,430 | 1/1991 | Sargent | 301/64.7 X |

FOREIGN PATENT DOCUMENTS

| | | | |
|---|---|---|---|
| 2919235 | 10/1980 | Fed. Rep. of Germany | 301/63.1 |
| 684284 | 6/1930 | France | 301/64.4 |
| 2580550 | 10/1986 | France | 301/64.7 |
| 0195401 | 11/1984 | Japan | 301/64.7 |
| 0038203 | 2/1985 | Japan | 301/64.7 |
| 0135801 | 6/1986 | Japan | 301/64.7 |
| 0068401 | 3/1988 | Japan | 301/64.7 |

*Primary Examiner*—Russell D. Stormer
*Attorney, Agent, or Firm*—Kanesaka and Takeuchi

[57] ABSTRACT

A compound resin wheel with two or more moldings integrated to form the resin wheel, wherein at least one of the two or more moldings made of a long fiber reinforced thermoplastic resin, the other molding or moldings made of metal and/or FRP.

32 Claims, 10 Drawing Sheets

COMPOUND RESIN WHEEL

BACKGROUND OF THE INVENTION

1. Field of the Invention

The present invention relates to a compound resin wheel, and is particularly concerned with a lightweight and mass-producible compound resin wheel which is surpassing in mechanical characteristics such as impact resistance, bending strength, rigidity, heat resistance, fatigue resistance, creep resistance and the like.

2. Description of the Prior Art

Wheels, or automobile wheels, for example, have ever been made generally of steel or light alloys (such as aluminum alloy and magnesium alloy).

Steel wheels are fabricated by pressing or roll forming, however, a dimensional dispersion is quite unavoidable in most cases, and a deviation is easy to occur particularly on the roundness of a bead seat of the rim. Moreover, the steel wheels are heavy and hence are not preferable for lightweight construction of automobile parts so required.

In the meantime, wheels made of light alloys are stably formed in dimensions and, in addition, sharply reduced in weight to one third of the steel wheels, however, what is disadvantageous is that the material cost is three to five times higher than that of the steel wheels.

Now, the lightweight requirement for the automobile parts is very important from the viewpoint of energy saving on which an emphasis has been placed lately, and thus the wheels must be made lightweight in respect of the fuel cost and the maneuverability.

Under such circumstances, a resin wheel has been proposed for satisfying the lightweight construction and the dimensional stability and the low manufacturing cost. The resin wheel is formed mainly of FRP (fiber-reinforced plastic) obtained from mixing short or long reinforcing fibers in a resin, and hence is light in weight as compared with the metallic wheel, superior in dimensional stability, available for mass production and also for reduction of manufacturing cost, and is excellent, still further, in the aspect of design factors such as coloration and the like.

Meanwhile, almost all of the resin wheels under examination so far and all the resin wheels developed hitherto are those made by the general FRP manufacturing technique, and so formed by pressing a thermosetting resin such as unsaturated polyester, epoxy resin or the like and FRP consisting of glass fiber and others (Japanese Patent Unexamined Publication No. 61-135801). The resin wheels thus obtained are superior in rigidity, strength and so forth, since fibers are not so severely damaged at the time of forming. In addition, the thermosetting resin is used mainly therefor, and hence the resin wheels are also superior in heat resistance and creep resistance. However, such process is not suitable for forming those with a complicated shape (for example, such one as is considerably variable in wall thickness), and a forming cycle is so long, thus leading to an unsatisfactory productivity.

On the other hand, an injection molding may ensure a high productivity and is superior in the aspect of production cost, however, injection moldings are generally ⅓ to 1/5 low in strength as compared with compression moldings. Thus, the injection molding does not satisfy the requirements of strength and rigidity of the products, because the reinforcing fibers are extremely short in length such as 1 mm or less as compared with materials (such as BMC, SMC and the like) used for compression molding so as to increase the fluidity of the materials.

SUMMARY OF THE INVENTION

An object of the present invention is to provide a compound resin wheel superior remarkably in lightweight construction and reinforced structure, ensuring the effects as:

(1) superior in characteristics in weight, strength particularly bending strength, impact resistance, rigidity, heat resistance, fatigue resistance, creep resistance and so forth;

(2) superior in uniformity, and almost no dispersion of the product quality;

(3) superior in mass productivity to reduce the manufacturing cost; and (4) a variety of products obtained from splitting the resin wheel into two pieces or more.

Another object of the present invention is to provide a compound resin wheel extremely high in utility.

A further object of the present invention is to provide a compound resin wheel suitable not only for automobiles in a narrow sense such as a passenger car, bus, truck and the like but also for automobiles in a wide sense such as a railway car, subway car, linear motor car, airplane, motorcycle, bicycle, golf cart, and other leisure carts used in recreation parks.

In a compound resin wheel for which two or more divided moldings are integrated, the invention is characterized in that at least one of the two or more divided moldings comprises a long-fiber reinforced thermoplastic resin, the other divided molding or moldings comprising metal and/or FRP.

That is, in order to solve the aforementioned problems inherent in the prior art resin wheel by improving molding materials and molding process, the present invention is to provide a compound resin wheel surpassing in mechanical characteristics, light in weight, superior in mass productivity and moderate in cost by integrating a divided resin molding superior in characteristics such as bending strength, rigidity, impact strength, heat resistance, fatigue resistance, creep resistance and so forth, having a homogeneous property throughout the product, moderate in cost and available for mass production with another divided molding consisting of a metal or FRP different from the divided resin molding.

Next, the present invention will be described in detail.

The compound resin wheel of the invention is fabricated by integrating one or more first members or portions (such as a rim, disk, hub and others) made of a long fiber reinforced thermoplastic resin and one or more residual second members or portions made of FRP, light metal or metal such as iron. The first and second members or portions are fitted and integrated each other by screwing or other means. Each of the first and second members or portions has the shape divided from a wheel, so that the member or portion may be called a "divided part" hereinafter. The first "divided part" made of the long fiber reinforced thermoplastic resin is manufactured by injection molding or injection compression molding.

In this connection, "screwing" is a process for fitting two independent portions together by turning the two in the counter direction to each other to some extent, and a relation between bolt and nut will be one example thereof.

Described first are the divided parts (such as rim or disk or hub portions) formed through an injection molding or injection compression molding with a long fiber reinforced thermoplastic resin of which the compound resin wheel of the present invention is constructed partly.

For reinforcing resins to enhance the mechanical characteristics, a fiber reinforcing process has generally been employed hitherto. In this case, however, while the thermosetting resin compound material reinforced by a continuous fiber exhibits a surpassing mechanical performance including impact resistance, the fluidity is unsatisfactory, and the working cost becomes high. On the other hand, the thermoplastic resin compound material reinforced by a short fiber can easily be formed by the injection molding, and is moderate in the working cost. However, what is disadvantageous is that the short fiber reinforced compound material does not so effectively improve the mechanical characteristics, and is low particularly in impact resistance.

Now, therefore, there is developed a long fiber reinforced thermoplastic resin compound material provided with a superior fluidity inherent in the short fiber reinforced resin compound material and having an effect in improving the mechanical characteristics equivalent to the continuous fiber reinforced thermosetting resin compound material. In the present invention, such long fiber reinforced thermoplastic resin is employed. Here, the short fiber means an ordinary short fiber 0.1 to 0.5 mm in length, and the long fiber indicates a fiber 1 mm or more in length.

The thermoplastic resin (or "matrix resin" otherwise hereinlater) working as a matrix of the long fiber reinforced thermoplastic resin relating to the invention may include various polyamide resins such as, nylon 6, nylon 6.6, nylon 4.6, nylon 6.10, nylon 10, nylon 11 and nylon 12, polybutylene terephthalate (PBT), polyphenylene sulfide (PPS), acetal resin (POM), polycarbonate (PC), polyethylene terephthalate (PET), polypropylene (PP), polyether sulfone (PES), polysulfone (PSF), polyether etherketone (PEEK), polyphenylene oxide (PPO), polyamidimide (PAI), polyimide (PI), polyester, various liquid crystalline polymers and partial aromatic polyamide for which aliphatic principal chain is substituted partially by aromatic group. Of these materials, various polyamide resins, partial aromatic polyamide, PBT, PPS, POM, PC, PES, PI, PAI, PEEK, polyester, and various liquid crystalline polymers are preferable. These thermoplastic resins may be used alone or as a mixture thereof.

On the other hand, fibers made of material such as glass, carbon, graphite, aramide, polyethylene, ceramics (such as SiC and $Al_2O_3$), metals (such as boron and stainless steel) and so forth are cited as the resin reinforcing fibers used in the present invention, and carbon or glass is effective above all. If the diameter of such reinforcing fibers is too small, then a sufficient reinforcing effect is not obtainable, and if excessively large on the contrary, the injection molding becomes hard to carry out, and the formability will not securely be ensured. Consequently, it is preferable that the diameter of reinforcing fibers come within the range of 0.1 to 100 $\mu m$, or 0.5 to 50 $\mu m$ particularly. Additionally, the fiber length will be 1 mm or longer, 2 to 30 mm particularly, or 3 to 15 mm preferably.

If the amount of reinforcing fibers added is too small, a sufficient effect is not obtainable therefrom, but if excessive on the contrary, then the matrix resin does not affect the formability. For this reason, the ratio of the amount of added reinforcing fibers to the amount of all molding materials will be 5 to 70% by volume, or preferably 10 to 60% by volume.

Then, in case the long fiber reinforced thermoplastic resin materials of the present invention are processed as practical moldings, an addition of a normal short fiber reinforced resin thereto is effective particularly in improving the workability. In such case, the ratio of the added short fiber reinforced resin will be not more than 70% by weight of the total amount, or preferably not more than 60%.

Further, it is preferable that an improver for enhancing a binding efficiency of the matrix resin and the resin reinforcing fiber be added to the long fiber reinforced thermoplastic resin so as to realize superior mechanical characteristics and workability. The improver used here may include polystyrene group polymers such as styrene-butadiene block copolymer (SBS), styrene-isoprene block copolymer (SIS), hydrogen-added styrene-butadiene block copolymer (SEBS), polystyrene (PS), acrylonitrile-butadiene-styrene resin (ABS) and the like; polyolefin group polymers such as polyethylene (PE), polypropylene (PP), ethylene-ethylacrylate copolymer (EEA), ethylenevinyl acetate copolymer (EVA), ethylene-propylene rubber (EPR), ethylenepropylene diene rubber (EPDM) and the like; polyester group polymers such as polyethylene terephthalate (PET), polybutylene terephthalate (PBT) and the like; polyacryl group polymers and polyamide group polymers such as methacrylic resin (PMMA), acrylic rubber and the like; further polyphenylene oxide (PPO), polyphenylene sulfide (PPS), butadiene acrylonitrile rubber (NBR), polyarylate (PAR), polycarbonate (PC), various liquid crystal polymers and others. Of these polymers, polyolefin group polymers and polystyrene group polymers are particularly efficacious.

It is preferable that these improvers be added at 1 to 40 parts by weight, or particularly 2 to 30 parts by weight to 100 parts by weight of the matrix resin.

Further, in the present invention, for the purpose of enhancing the compatibility of these improvers with the matrix resin, it is effective to subject the improvers and the matrix resin or a polymer compatible with the matrix resin to a block or graft copolymerization, or introduce a radical having a reactivity with a radical of the matrix resin into a principal chain or side chain of the improvers for denaturation. In this case, the reactive radical includes epoxy radical, carboxyl radical, maleic anhydride radical, amino radical, sulfone radical and oxazoline radical, of which maleic anhydride radical and epoxy radical are particularly efficacious.

Further, for similar purpose, various admixtures may be used effectively. The admixture may include a copolymer having a compatibility with both the improver and matrix resin or a radical reactive with both the two, and an organic compound denatured by the reactive radical. Generally, copolymers of olefin group, styrene group or acryl group are efficacious, and various copolymers with maleic anhydride radical and/or epoxy radical introduced into a principal chain or side chain are particularly efficacious.

For the purpose of improving weatherability, heat resistance, wear resistance, fluidity, coefficient of thermal expansion, flame resistance, chemical resistance and other characteristics, it is effective to mix necessary amounts of various fillers, age resistors, crosslinking agents, oils, plasticizers, oligomers and elastomers in the long fiber reinforced thermoplastic resin material relating to the present invention.

A method for reinforcing the above-described thermoplastic resin with the resin reinforcing fiber will now be described.

That is, for example, a roving of a continuous fiber delivered from a robbin is drawn out through a molten thermoplastic resin of low viscosity, each monofilament surface is moistened with the resin and then passed through a cooling pipe, thereby aligning the filaments in the direction drawn out for hardening. From cutting the continuous thermoplastic resin impregnated roving into a predetermined length, a reinforcing fiber having the length so cut is obtainable (Japanese Patent Unexamined Publication No. 57-181852).

Then, from processing granular bodies in which a rodlike body 0.5 to 3 mm in diameter has a length of 2 to 30 mm, preferably 3 to 15 mm as a forming material according to the usual process, a product made of the long fiber reinforced thermoplastic resin material of the present invention is easily obtainable. In this case, the contained fiber length can be adjusted arbitrarily by cutting as mentioned above. Further, since such long fibers are formed through drawing, the fibers can be impregnated with the resin satisfactorily in good condition.

In the above-described method, the long fiber reinforced resin may be obtained by adding the improver which is a tertiary component or the improver and the admixture beforehand to the thermoplastic resin which is a primary component, or pelletizing the mixture further as occasion demands, and then impregnating the long fiber which is a secondary component therewith, or otherwise the improver and the admixture may be added later to the long fiber reinforced thermoplastic resin formed beforehand of the primary component and the secondary component.

On the other hand, in the compound resin wheel according to the present invention, other divided parts than the divided part formed by means of the long fiber reinforced thermoplastic resin are formed of conventional base materials such as FRP and/or metal, of which FRP includes such FRP consisting, for example, of thermosetting resin and glass or carbon fiber. Further, the metal includes light metal or light alloy such as aluminum alloy, magnesium alloy, titanium alloy or the like, heavy metal or heavy alloy such as iron or the like, or fiber-reinforced light metal (alloy) comprising a reinforcing fiber in the light metal and light alloy, however, the light metal, light alloy or the fiber reinforced light metal (alloy) are efficacious particularly.

In the compound resin wheel according to the present invention, either one or both of the metallic divided part and FRP divided part may be combined with the divided part consisting of a long fiber reinforced thermoplastic resin.

From combining and integrating the divided part using a long fiber reinforced thermoplastic resin with the divided part using a conventional base materials such as metal and/or FRP, not only characteristics of both the two are enhanced but also the compound resin wheel having surpassing characteristics is obtainable through a synergistic effect.

DETAILED DESCRIPTION OF PREFERRED EMBODIMENTS

Embodiments of the present invention will be described in detail with reference to the drawings.

FIG. 1, FIG. 2, FIG. 3 and FIG. 4 are sectional views representing compound resin wheels according to embodiments of the present invention. Here, FIG. 1 to FIG. 4 are sectional views showing upper half portions of the compound resin wheels, and in FIG. 1 to FIG. 4 and subsequent drawings, a reference numeral 1 denotes a rim, 2 denotes a disk, 3 denotes a hub, and 3A denotes a hub bolt hole. Further in FIG. 1, 4 denotes a bolt coupling the rim 1 and the disk 2 together.

Figure 1:
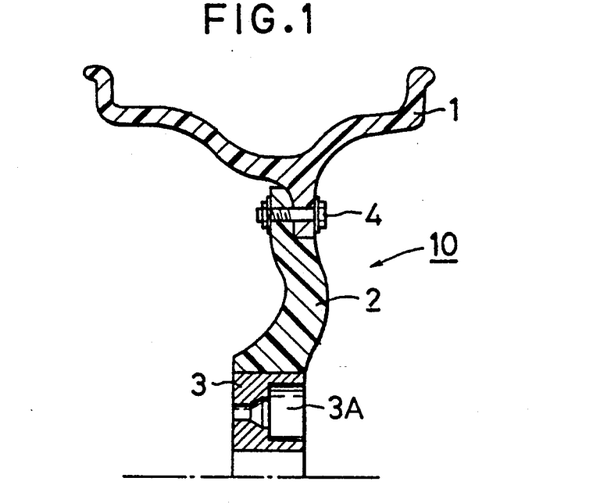
FIG. 1 is a sectional view representing a compound resin wheel given in one embodiment of the present invention.
Figure 2:
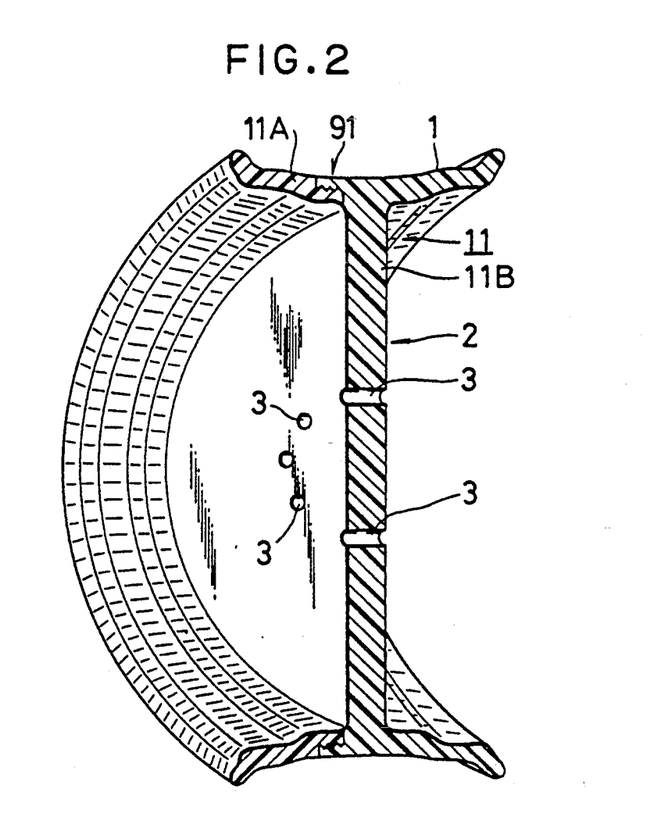
FIG. 2 is a sectional view representing a compound resin when given in another embodiment of the present invention.

A compound resin wheel 10 indicated in FIG. 1 is divided into the rim 1, the disk 2 and the hub 3, however, in the compound resin wheel of the present invention, no limitation will be particularly placed on the number of divided parts constructing the wheel and also on positions where to divide the wheel. A wheel 11 shown in FIG. 2 comprises divided parts 11A and 11B divided in the rim 1. A wheel 12 shown in FIG. 3A comprises divided parts 12A, and 12B, 12C and 12D divided in the disk 2. A wheel 13 shown in FIG. 4 comprises divided parts 13A, 13B, 13C, 13D and 13E divided in the rim 1 and the disk 2. In FIG. 1 to FIG. 4, each divided part is formed independently, and reference numerals 91 to 99 denote portions whereat the divided parts are fitted together.

In the compound resin wheel 10 of FIG. 1, for example, the rim 1 is made of long fiber reinforced thermoplastic resin, the disk 2 is made of aluminum and the hub 3 is made of aluminum. Further, in FIG. 2 to FIG. 4, the divided parts 2 and 3 are made of long fiber reinforced thermoplastic resin, and the other divided part 1 is made of metal or FRP. These combinations are not particularly limited, and hence various other combinations are conceivable and employable for the resin wheel.

A clamping by the bolt 4 shown in FIG. 1 is the most general process for fitting each divided part. For better binding, it is effective to apply an adhesive to a contact surface of each divided part. While the binding by means of a bolt is simple and moderate in cost as well, it is necessary that portions whereat, for example, both the rim 1 and disk 2 overlap be provided for binding, and since such portions will be joined by a metallic bolt, a disadvantage is such that the weight increases more than that of a one-piece wheel.

Now, therefore, the method wherein each divided part of the compound resin wheel is formed independently, and then the divided parts are fitted into each other for integration by screwing is proposed.

Figure 5:
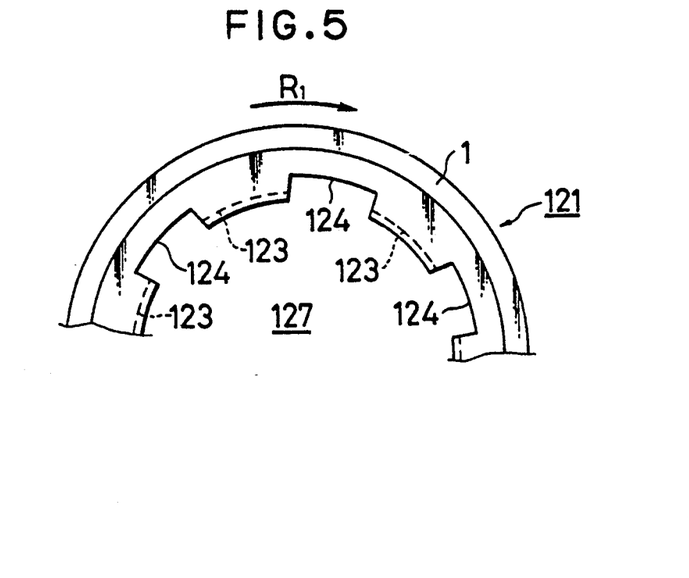
FIG. 5 is a front view illustrating fitting portions of the compound resin wheel of FIG. 3B.
Figure 6:
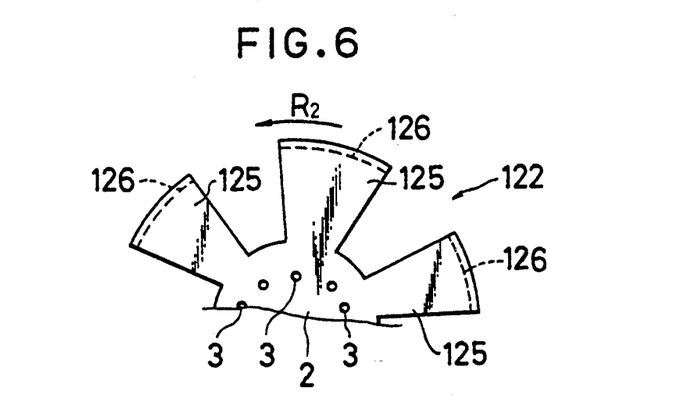
FIG. 6 is a front view illustrating fitting portions of the compound resin wheel of FIG. 3B.

A wheel 120 of FIG. 3B will be described further in detail with reference to FIG. 5 and FIG. 6.

Figures 3A, 3B, 4:
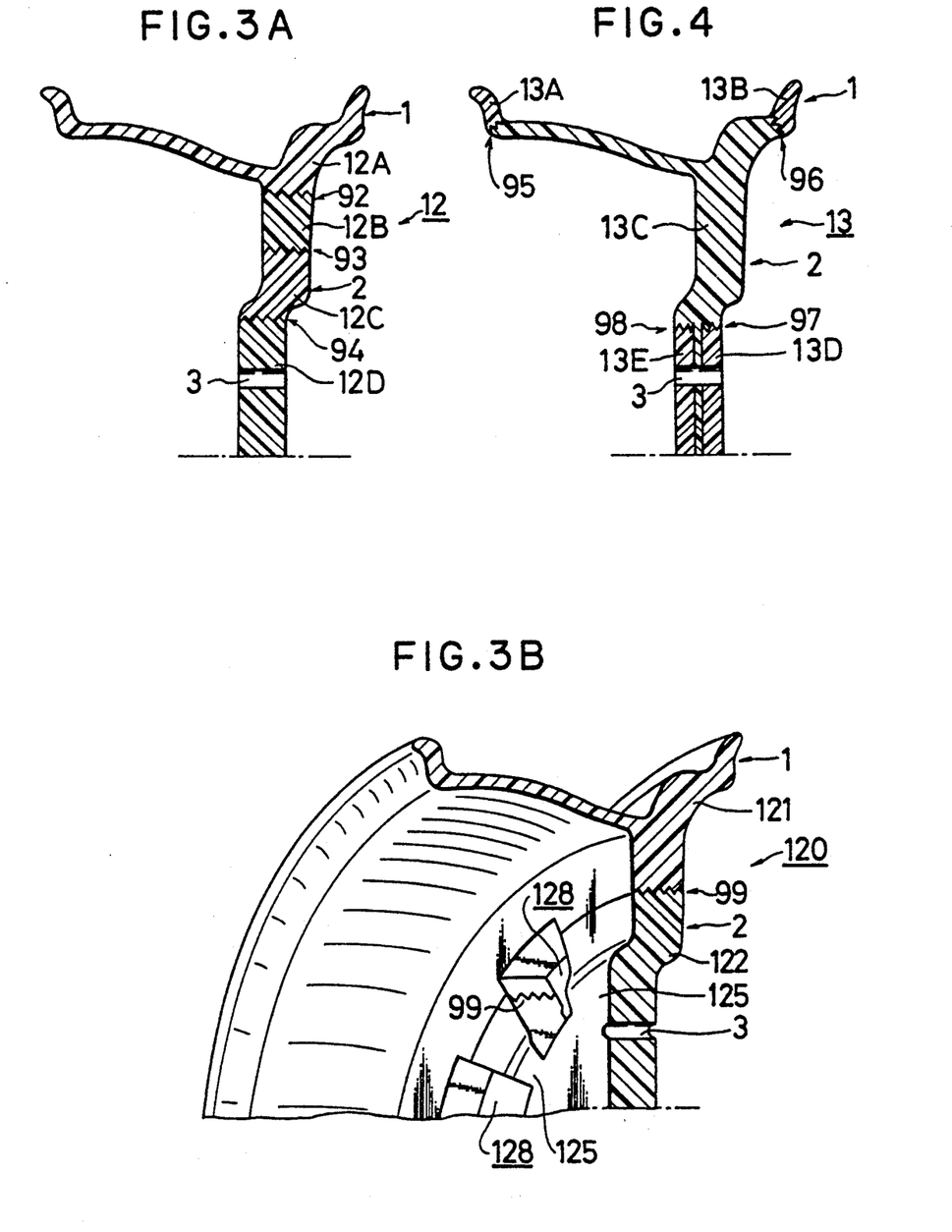
FIG. 3A is a sectional view representing a compound resin wheel given in a further embodiment of the present invention.
FIG. 3B is a sectional view representing a compound resin wheel given in a still further embodiment of the present invention.
FIG. 4 is a sectional view representing a compound resin wheel given in another embodiment of the present invention.

The wheel 120 of FIG. 3B comprises divided parts 121, 122 in the disk. The divided part 121 of the wheel 120 has the rim 1 and a peripheral portion of the disk 2. The divided part 121 has a plurality of notches 124 on the inner periphery. A threaded portion 123 is provided peripherally on the surface free from the notches 124. The divided part 122 has a central portion of the disk 2. The divided part 122 has radial portions 125, and a threaded portion 126 is provided peripherally on the nose surface (outer periphery) of each radial portion 125. The divided part 122 is fitted, as turning, into a central hole 127 of the divided part 121 so as to mate the threaded portion 123 and the threaded portion 126 with each other. Reference characters $R_1$ and $R_2$ indicate the directions in which the divided parts 121 and 122 are turned, respectively. Needless to say, one of the divided parts may be kept at rest in this case. Thus, the wheel 120 with windows 128 left open is completed as shown in FIG. 3B.

Figure 7:
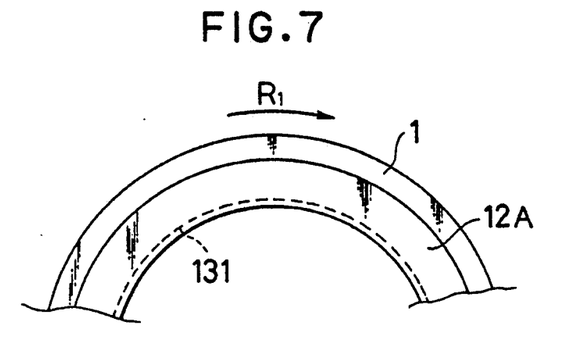
FIG. 7 is a front view illustrating fitting portions of the compound resin wheel of FIG. 3A.
Figure 8:
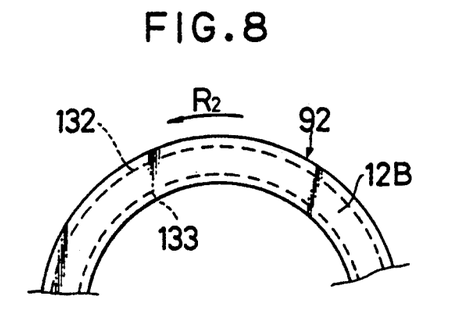
FIG. 8 is a front view illustrating fitting portions of the compound resin wheel of FIG. 3A.

FIG. 7 and FIG. 8 indicate a method for binding the divided parts 12A, 12B of the wheel 12 of FIG. 3A together. The divided parts 12A and 12B are put together by screwing a threaded portion 131 on an inner periphery of the divided part 12A over a threaded portion 132 on an outer periphery of the divided part 12B in the direction $R_1$. A threaded portion on an outer periphery of the divided part 12C is screwed into a threaded portion 133 on an inner periphery of the divided part 12B in the direction $R_2$. A threaded portion on an outer periphery of the divided part 12D is screwed into a threaded portion on an inner periphery of the divided part 12C.

Figure 9:
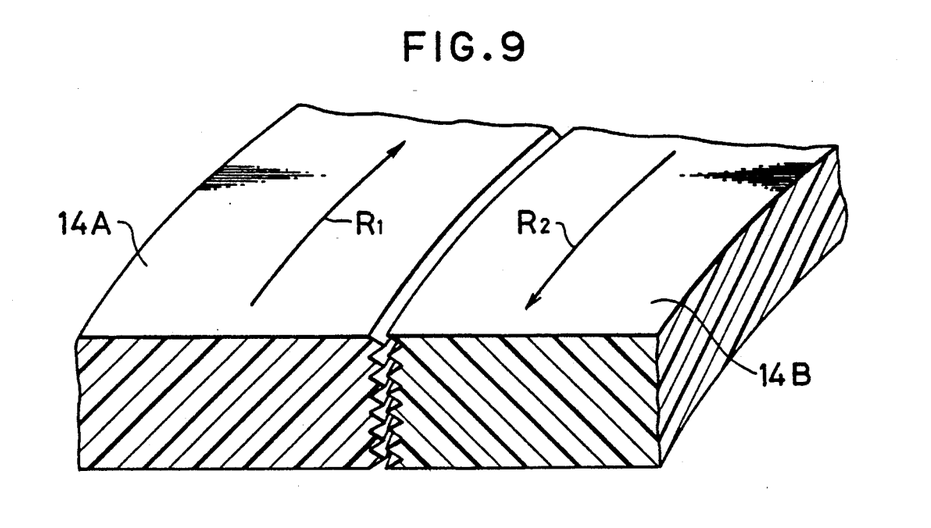
FIG. 9 is a perspective sectional view showing one example of fitting portions.
Figure 10:
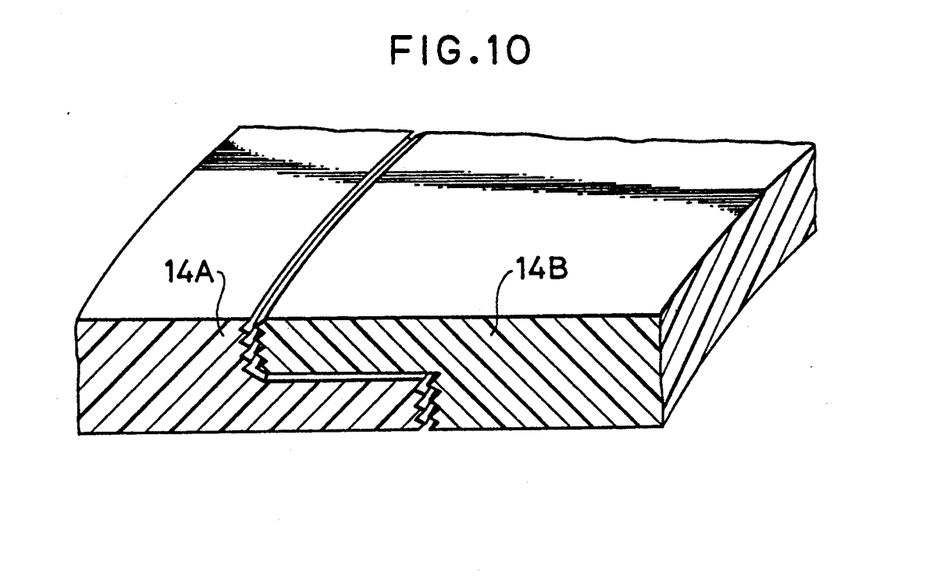
FIG. 10 is a perspective sectional view showing another example of the fitting portions.
Figure 11:
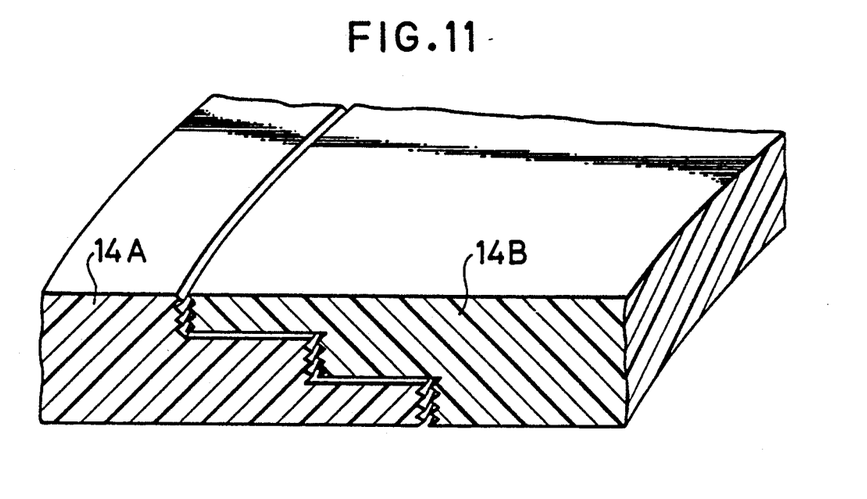
FIG. 11 is a perspective sectional view showing a further example of the fitting portions.
Figure 12:
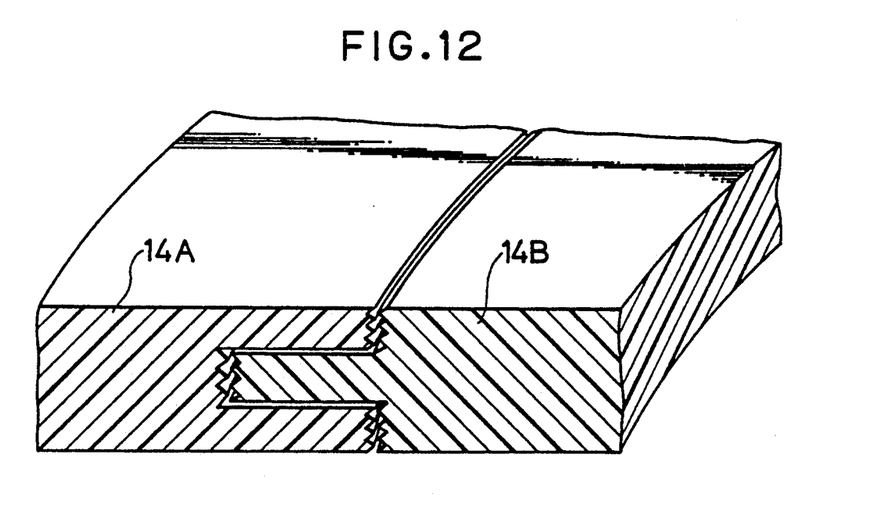
FIG. 12 is a perspective sectional view showing a still further example of the fitting portions.

Next described is a form of the fitting portions. For the fitting portions to be fitted firmly by screwing, that is, in FIG. 9 (perspective sectional view of the fitting portions), a pair of male and female screw threads is provided generally on fitting surfaces of the divided parts 14A and 14B so as to allow the divided parts 14A and 14B to engage with each other and rotate in the counter directions $R_1$ and $R_2$, respectively, for screwing. The fitting portions can be threaded in multiple stages as shown in FIG. 10, FIG. 11 and FIG. 12, and according to such screw threads provided in multiple stages, both the divided parts 14A and 14B can be fitted together more effectively and firmly.

Figure 13:
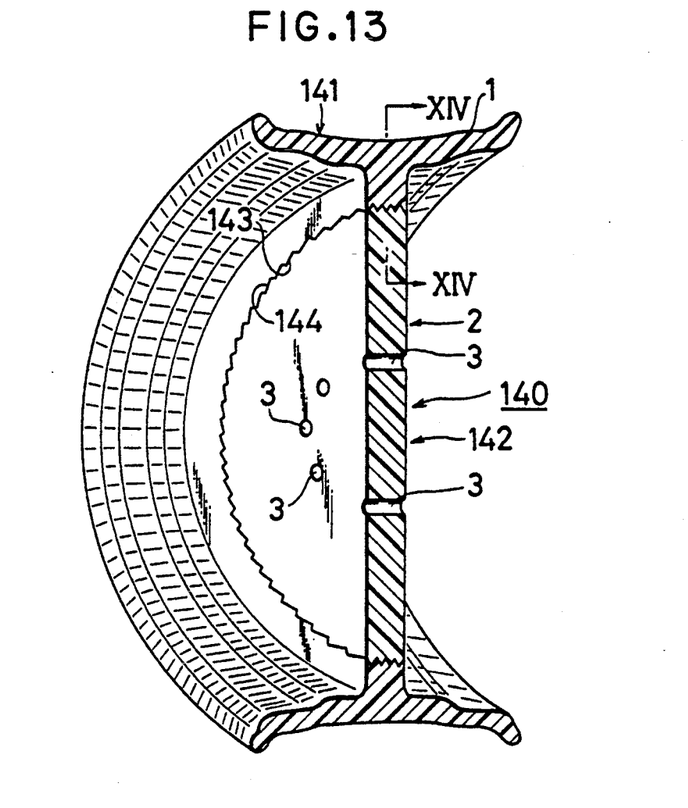
FIG. 13 is a perspective sectional view showing another example of the fitting portions.
Figure 14:
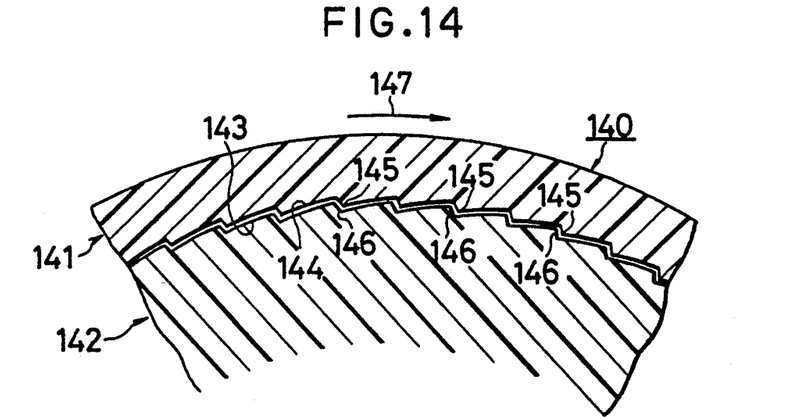
FIG. 14 is a sectional view taken on line XIV—XIV of FIG. 13.

In the resin wheel of the present invention, the screw threads may be provided in the form of ratchet teeth as shown in FIG. 13 and FIG. 14 so as to prevent the fitting portions from loosening and coming off and also to enhance the strength of the resin wheel.

A wheel 140 comprises a divided part 141 on the rim side and a divided part 142 on the hub center side, and a thread 143 on an inner periphery of the divided part 141 and a thread 144 on an outer periphery of the divided part 142 are screwed each other. Both the threads 143, 144 extend peripherally. Ratchet teeth 145, 146 are provided regularly in the peripheral direction. Accordingly, the divided part 141 can be rotated in the direction indicated by an arrow 147, that is, in the tightening direction, but not in the counter direction, that is in the loosening direction.

Figure 15:
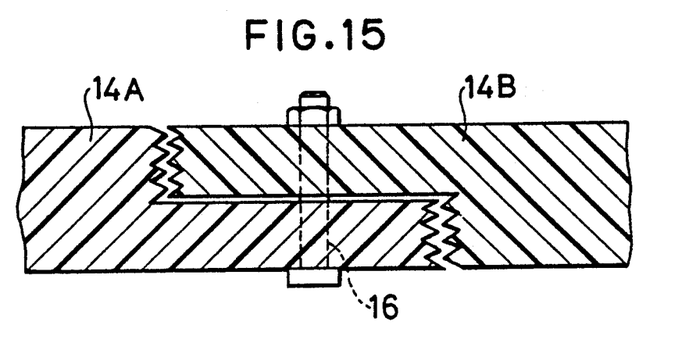
FIG. 15 is a sectional view showing a further example of the fitting portions.

In this connection, a method of coupling the multistage fitting portions by means of a bolt 16 or a rivet as shown in FIG. 15 is also effective for locking.

Figure 16:
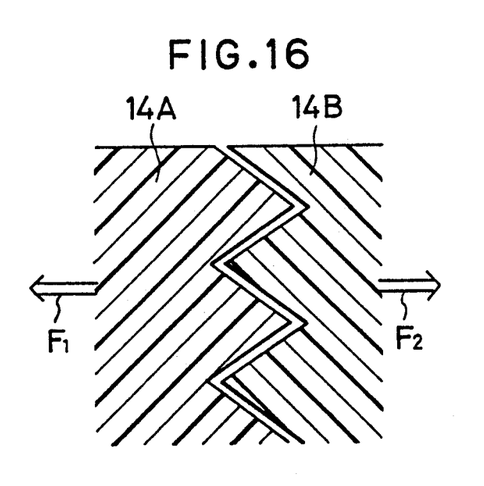
FIG. 16 is an enlarged sectional view showing one example of threaded forms of the fitting portions.
Figure 17:
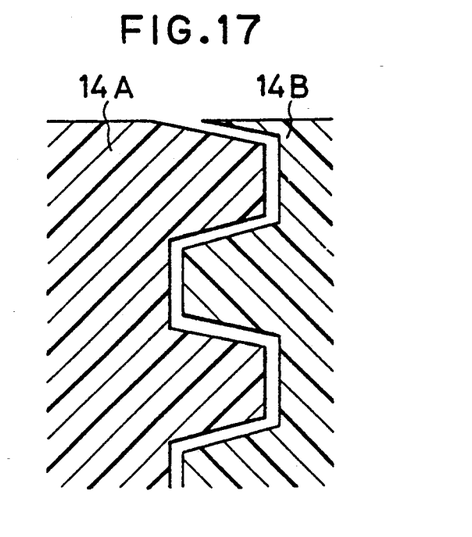
FIG. 17 is an enlarged sectional view showing another example of threaded forms of the fitting portions.
Figure 18:
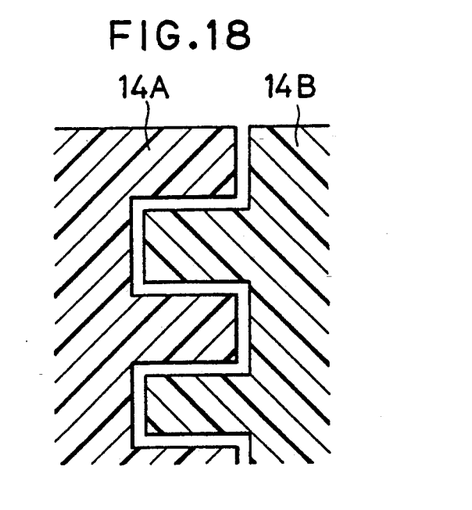
FIG. 18 is an enlarged sectional view showing a further example of threaded forms of the fitting portions.
Figure 19:
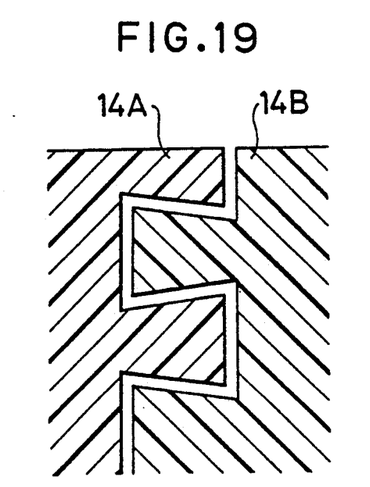
FIG. 19 is an enlarged sectional view showing a still further example of threaded forms of the fitting portions.
Figure 20:
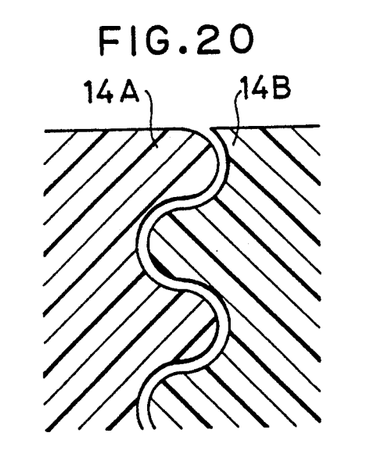
FIG. 20 is an enlarged sectional view showing another example of threaded forms of the fitting portions.
Figure 21:
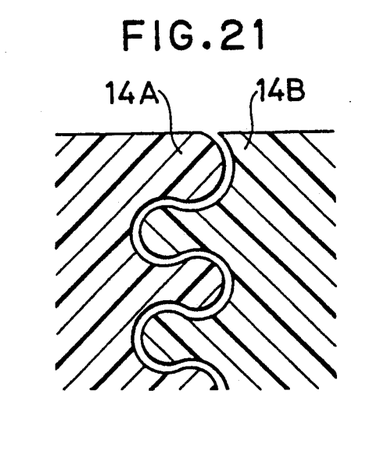
FIG. 21 is an enlarged sectional view showing a further example of threaded forms of the fitting portions.

Further, for preventing the fitting portions from coming off on counter-acting tensile forces $F_1$, $F_2$ shown in FIG. 16 and disengaging into both divided parts 14A, 14B, improvements of threaded forms of the fitting portions as shown in FIG. 17 to FIG. 21 will be effective.

The forms available for preventing the fitting portions from loosening and coming off as described above are given merely as examples, and hence any other forms may be employed without departing from the spirit and scope of the present invention as long as the object is substantially attained.

Further, in the resin wheel according to the present invention, the construction wherein an adhesive is interposed between concave and convex surfaces whereat both the divided parts 14A and 14B of the fitting portions shown in FIG. 9 to FIG. 21 are fitted together, or in a gap between contact surfaces of both the divided parts 14A and 14B of each stage of the multi-stage fitting portions, thereby binding the divided parts 14A and 14B firmly, or otherwise these portions are bonded together by thermal fusion will be quite effective in improving the strength of the fitting portions and preventing loosening and coming-off of the divided parts.

In the examples given above, the description has been referred for a method for fitting the divided parts together to integration by means of bolts and screwing, however, the invention is not necessarily limited thereto. Other effective method include molding both the divided parts integrally according to a so-called insert process wherein metallic or FRP divided parts are molded by setting them at a predetermined position in a metallic mold, and then injecting a long fiber reinforced thermoplastic resin therein.

What is claimed is:

1. A compound resin wheel comprising:
   at least two moldings integrated together to form at least a part of the resin wheel,
   at least one of the moldings being made of a long fiber reinforced thermoplastic resin, and
   the other molding being made of one of metal and fiber reinforced plastic,
   the moldings having fitting portions provided with screw threads thereon for integrating the moldings by screwing and ratchet teeth on the screw threads to allow the moldings to turn in a tightening direction but prevent the moldings from turning in a loosening direction, thereby increasing the strength of the resin wheel.

2. The compound resin wheel as defined in claim 1, wherein the two moldings constitute a rim portion of the resin wheel.

3. The compound resin wheel as defined in claim 1, wherein the moldings constitute a disk portion of the resin wheel.

4. The compound resin wheel as defined in claim 1, wherein the moldings constitute rim and disk portions of the resin wheel.

5. The compound resin wheel as defined in claim 1, wherein the screw threads are provided in multiple stages of the fitting surfaces.

6. The compound resin wheel as defined in claim 1, wherein the fitting portions of the moldings are fixed by a bolt or rivet.

7. The compound resin wheel as defined in claim 1, wherein an adhesive is interposed between the fitting surfaces of the moldings.

8. The compound resin wheel as defined in claim 1, wherein the fitting portions of the moldings have a fused portion between them.

9. The compound resin wheel as defined in claim 1, wherein the one of the moldings further comprises granular bodies, a continuous fiber and a thermoplastic resin.

10. The compound resin wheel as defined in claim 1, wherein the one of the moldings further comprises granular bodies, a continuous fiber, a thermoplastic resin, and a short fiber reinforced resin.

11. The compound resin wheel as defined in claim 1, wherein the long fiber reinforced thermoplastic resin has a matrix of at least one kind of nylon 6, nylon 6,6, nylon 4,6, nylon 6,10, nylon 10, nylon 11 and nylon 12, polybutylene terephthalate (PBT), polyphenylene sulfide (PPS), acetal resin (POM), polycarbinate (PC), polyethylene terephthalate (PET), polypropylene (PP), polyether sulfone (PES), polysylfone (PSF), polyether etherketone (PEEK), polyphenylene oxide (PPO), polyamidimide (PAI), polyimide (PI), polyester, various liquid crystalline polymers and partial aromatic polyamide in which an aliphatic principal chain is substituted partially by an aromatic group.

12. The compound resin wheel as defined in claim 1, wherein the long fiber reinforced thermoplastic resin comprises at least one kind of polyamide resin, partial aromatic polyamide, PBT, PPS, POM, PC, PES, PI, PAI, PEEK, polyester, and various liquid crystalline polymers.

13. The compound resin wheel as defined in claim 1, wherein the long fiber reinforced thermoplastic resin comprises a reinforcing fiber of 1 nm or longer in length.

14. The compound resin wheel as defined in claim 1, wherein the long fiber reinforced thermoplastic resin comprises a reinforcing fiber of 2 to 30 mm in length.

15. The compound resin wheel as defined in claim 1, wherein the long fiber reinforced thermoplastic resin comprises a reinforcing fiber of 3 to 15 mm in length.

16. The compound resin wheel as defined in claim 1, wherein the long fiber reinforced thermoplastic resin comprises a reinforcing fiber of 0.1 to 100 $\mu$m in diameter.

17. The compound resin wheel as defined in claim 1, wherein the long fiber reinforced thermoplastic resin comprises a reinforcing fiber of 0.5 to 50 $\mu$m in diameter.

18. The compound resin wheel as defined in claim 1, wherein the long fiber reinforced thermoplastic resin comprises 5 to 70% by volume of reinforcing fiber.

19. The compound resin wheel as defined in claim 1, wherein a short fiber reinforced resin is mixed in the one of the moldings.

20. The compound resin wheel s defined in claim 19, wherein the short fiber reinforced resin is mixed at 70% or less of the one of the moldings.

21. The compound resin wheel as defined in claim 1, wherein the long fiber reinforced thermoplastic resin comprises a resin reinforcing fiber made of one of glass, carbon, graphite, aramide, polyethylene, ceramic and metal.

22. The compound resin wheel as defined in claim 21, the ceramic is made of at least one of silicon carbide and aluminum oxide.

23. The compound resin wheel as defined in claim 21, the metal is made of at least one of boron and stainless steel.

24. The compound resin wheel as defined in claim 1, wherein the long fiber reinforced thermoplastic resin comprises a matrix resin, a resin reinforcing fiber, and 1 to 40 parts by weight of an improver relative to 100 parts by weight of the matrix resin so as to provide excellent mechanical characteristics and workability.

25. The compound resin wheel as defined in claim 24, wherein the improver is at least one kind of polystyrene group polymers selected from the group consisting of styrene-butadien block copolymer, styrene-isoprene block copolymer, hydrogen-added styrene-butadiene block copolymer, polystyrene, and acrylonitrile-butadiene-styrene resin; polyolefin group polymers selected from the group consisting of polyethylene, polypropylene, ethylene-ethylacrylate copolymer, ethylenevinyl acetate copolymer, ethylene-propylene rubber, and ethylenepropylene diene rubber; polyester group polymers selected from the group consisting of polyethylene terephthalate and polybutylene terephthalate; polyacryl group polymers and polyamide group polymers selected from the group consisting of methacrylic resin and acrylic rubber; polyphenylene oxide, polyphenylene sulfide, butadiene acrylonitrile rubber, polyacrylate, polycarbonate, and liquid crystal polymers.

26. The compound resin wheel as defined in claim 24, wherein the long fiber reinforced thermoplastic resin comprises an admixture which includes one of a copolymer having a compatibility with both the improver and the matrix resin and a radical reactive with both the improver and the matrix resin, and an organic compound denatured by the reactive radical.

27. The compound resin wheel as defined in claim 1, wherein the long fiber reinforced thermoplastic resin comprises at least one of filler, age resistor, crosslinking agent, oil, plasticizer, oligomer and elastomer for the purpose of improving at least one of weatherability, heat resistance, wear resistance, fluidity, coefficient of thermal expansion, flame resistance, and chemical resistance.

28. The compound resin wheel as defined in claim 1, wherein the fiber reinforced plastic comprises at least one of thermosetting resin and glass and carbon fiber.

29. The compound resin wheel as defined in claim 1, wherein the metal is one kind of aluminum alloy, magnesium alloy, titanium alloy and iron.

30. The compound resin wheel as defined in claim 1, wherein the metal is a fiber reinforced light metal.

31. The compound resin wheel as defined in claim 1, further comprising one of metallic divided part and a fiber reinforced plastic divided part combined with the molding formed of the long fiber reinforced thermoplastic resin.

32. The compound resin wheel as defined in claim 1, further comprising, a metallic divided part and a fiber reinforced plastic divided part combined with the molding made of the long fiber reinforced thermoplastic resin.

* * * * *